United States Patent
Knorr

(10) Patent No.: US 10,141,883 B2
(45) Date of Patent: Nov. 27, 2018

(54) INPUT STAGE FOR A MOTOR CONTROLLER, AND MOTOR CONTROLLER, ESPECIALLY FOR AN ELECTRIC MOTOR

(71) Applicant: Ziehl-Abegg SE, Künzelsau (DE)

(72) Inventor: Joachim Knorr, Niederstetten (DE)

(73) Assignee: ZIEHL-ABEGG SE, Kunzelsau (DE)

( * ) Notice: Subject to any disclaimer, the term of this patent is extended or adjusted under 35 U.S.C. 154(b) by 0 days.

(21) Appl. No.: 15/536,530

(22) PCT Filed: Nov. 20, 2015

(86) PCT No.: PCT/DE2015/200513
§ 371 (c)(1),
(2) Date: Jun. 15, 2017

(87) PCT Pub. No.: WO2016/095914
PCT Pub. Date: Jun. 23, 2016

(65) Prior Publication Data
US 2017/0324366 A1 Nov. 9, 2017

(30) Foreign Application Priority Data
Dec. 15, 2014 (DE) .......................... 10 2014 225 876

(51) Int. Cl.
*H02P 29/40* (2016.01)
*H02P 31/00* (2006.01)
(Continued)

(52) U.S. Cl.
CPC ............... *H02P 29/40* (2016.02); *H02P 6/00* (2013.01); *H02P 6/06* (2013.01); *H02P 6/08* (2013.01)

(58) Field of Classification Search
CPC .................................. H02P 29/40; H02P 31/00
(Continued)

(56) References Cited

U.S. PATENT DOCUMENTS 4,227,139 A * 10/1980 Rosink .................... H02P 23/06
318/803
4,856,286 A 8/1989 Sulfstede et al.
(Continued)

FOREIGN PATENT DOCUMENTS

JP H07250180 A 9/1995

OTHER PUBLICATIONS

International Search Report for PCT/DE2015/200513 dated Jun. 14, 2016.
Klaus Müller et al., DiSEqC 2.0 für Techniker, Feb. 28, 1999, pp. 1-12, XP055271466, URL:http://www.spaun.de/files/8df79_de_DiS (retrieved on May 10, 2016).

*Primary Examiner* — Bentsu Ro
(74) *Attorney, Agent, or Firm* — McDonnell Boehnen Hulbert & Berghoff LLP

(57) ABSTRACT

The invention relates to an input stage (1) for a motor controller (2), especially a motor controller for an electric motor, the input stage (1) being provided with an input (3) for inputting an input signal and an output (4) for connection to the motor controller (2). The input stage (1) is designed to generate a control signal from an input signal between a first voltage $U_{unten}$ and a second voltage $U_{oben} > U_{unten}$ and output said control signal as a parameter to the motor controller (2) via the output (4). In order to be able to simultaneously use the control input (13) for communicating, the input stage (1) comprises a first comparator (5) for comparing the input signal with a first threshold voltage $U_{s1} > U_{oben}$ as well as a data output unit (10). The data output unit (10) generates a communication signal on the basis of at least one portion of the input signal. When the input signal reaches or exceeds the first threshold voltage $U_{s1}$, the first comparator (5) outputs an activation signal which activates output of the communication signal to the output (4) by the data output unit (10). The invention further relates to a motor controller, especially for an electric motor, comprising a (Continued)

corresponding input stage, and to an interface adapter for the input stage.

16 Claims, 1 Drawing Sheet

(51) Int. Cl.
*H02P 6/00* (2016.01)
*H02P 6/06* (2006.01)
*H02P 6/08* (2016.01)

(58) Field of Classification Search
USPC .......................................................... 318/558
See application file for complete search history.

(56) References Cited

U.S. PATENT DOCUMENTS

| | | | | |
|---|---|---|---|---|
| 4,996,466 | A * | 2/1991 | Su ........................... | G11B 15/18 318/6 |
| 5,361,025 | A * | 11/1994 | De Filippis ............... | H02P 6/08 318/599 |
| 6,274,991 | B1 * | 8/2001 | Busch ....................... | H02P 6/06 318/245 |
| 7,031,454 | B1 | 4/2006 | Stelman | |
| 7,646,162 | B2 * | 1/2010 | Ma ........................... | H02P 7/29 318/599 |

* cited by examiner

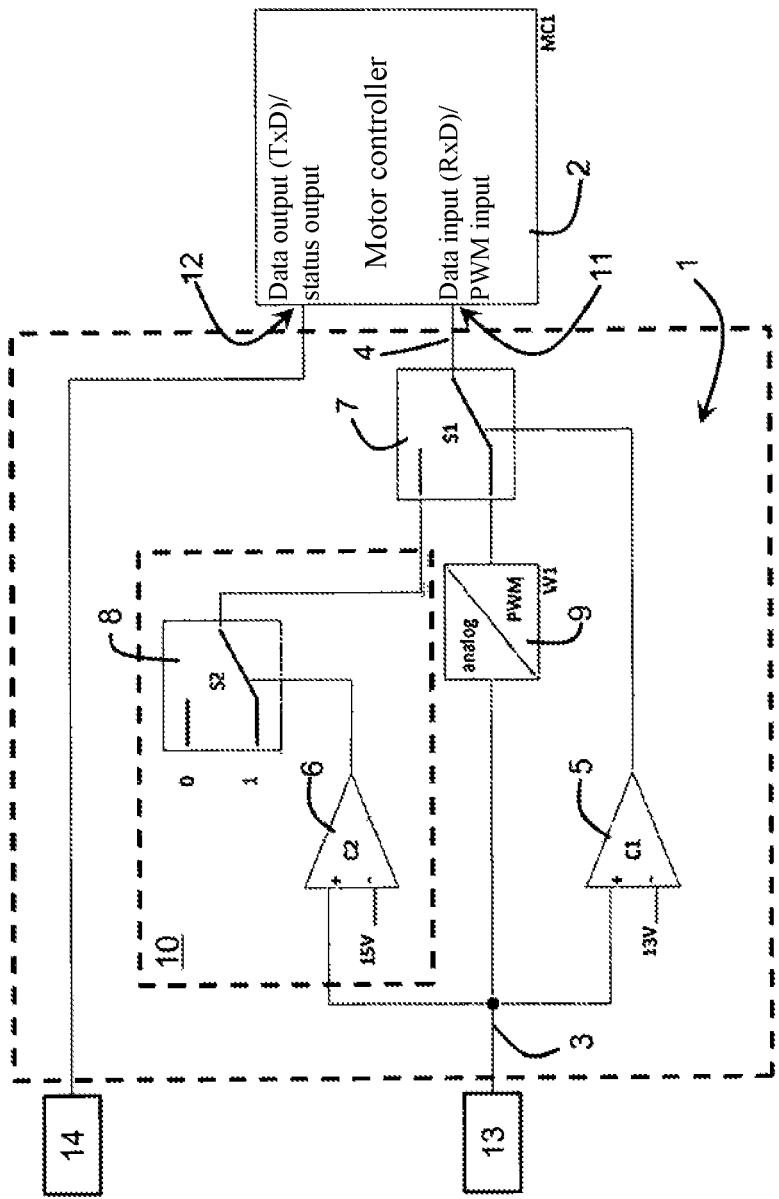

INPUT STAGE FOR A MOTOR CONTROLLER, AND MOTOR CONTROLLER, ESPECIALLY FOR AN ELECTRIC MOTOR

This application is a U.S. National Phase Application pursuant to 35 U.S.C. § 371 of International Application No. PCT/DE2015/200513 filed Nov. 20, 2015, which claims priority to German Patent Application No. 10 2014 225 876.6 filed Dec. 15, 2014. The entire disclosure contents of these applications are herewith incorporated by reference into the present application.

The invention relates to an input stage for a motor controller, in particular a motor controller for an electric motor, wherein the input stage has an input for inputting an input signal and an output for connection to the motor controller, wherein the input stage is designed to generate a control signal from an input signal between a first voltage $U_{unten}$ and a second voltage $U_{oben} > U_{unten}$, and to output said control signal as a parameter to the motor controller via the output.

The invention also relates to a motor controller, in particular for an electric motor, having a corresponding input stage, wherein the input stage is connected to a control input of the motor controller, wherein the motor controller controls the motor connected to the motor controller on the basis of a control signal received via the control input, such that a target value encoded in the control signal is at least approximately maintained.

The invention also relates to a corresponding interface adapter.

Motor controllers are used for controlling numerous electric motors. They generate one or more voltages for controlling the electric motor from an AC or DC voltage. For some motor technologies, e.g. EC (electrically commutated) motors, this is actually essential, because the motor controller outputs voltages to the stator of the motor, which then first cause the rotor to rotate. The motor controller is frequently integrated in the housing of the motor, or in a supplementary housing disposed on the motor housing. Such motor controllers are sufficiently known in the practice. A scope of application for such motor controllers comprises ventilators having an EC motor with integrated electronics.

In order to specify a rotational rate, a control signal in the form of an analog signal is typically inputted to the motor controller. A control signal of this type can be a voltage between 0 V and 10 V, for example. The control signal is outputted by a controlling device, which specifies a target rotational rate in a ventilator controller, as a function of a measured temperature. A message output is frequently provided in the motor controller, via which the status information can be outputted to the motor connected thereto. The correct functioning or a malfunction of the motor can be communicated via the message output, for example.

In practice, motor controllers are known in which the operating behavior of the motor connected thereto can be modified by parameterization and/or adapted to customer requirements, without modifying the firmware in the motor controller, i.e. adjusting the programming. This possibility is important in many cases in order to obtain a certain flexibility regarding customer adjustments with regard to the aspect of certification and licensing, which can make firmware modifications very complicated.

A communication interface is necessary for the parameterization, which can frequently be used for inputting a new firmware in the motor controller. Many changes to the parameterization that occur are necessary, however, in the framework of a start-up of a system, in order to adapt the system to the actual operating environment as well a possible through setting parameters. For this reason, the communication interface must be accessible, even after completion of the device or system in which the motor and the motor controller are incorporated. The disadvantage is that, as a result, there are narrow tolerances with respect to the installation location of the motor controller, or that supplementary communication lines, including their circuit points, must be installed. The first option frequently cannot be fulfilled, for example, with ventilators, because they are incorporated in numerous devices and systems such that they are difficult to access. The provision of communication lines results in additional installation effort, and requires connection space for the clips. Because a parameterization in many systems only needs to be carried out once, or very rarely, the effort associated therewith is insignificant in comparison with the use thereof.

The object of the invention is therefore to design and further develop an input stage, a motor controller and an interface adapter of the type specified in the introduction, such that a communication with the motor controller can be obtained with as little installation effort as possible and with low costs.

In accordance with the invention, the above objective is achieved by the features of Claim 1. Accordingly, the input stage in question is characterized by a first comparator for comparing the input signal with a first threshold voltage $U_{S1} > U_{oben}$, and a data output unit, wherein the data output unit generates a communication signal on the basis of at least a portion of the input signal, wherein the first comparator outputs an activation signal when the input signal reaches or exceeds the first threshold voltage $U_{S1}$, which activates an output of the communication signal by the data output unit to the output.

With regard to a motor controller, the above objective is achieved through the features of Claim 9. Accordingly, the motor controller in question is characterized in that the motor controller has means for detecting a communication signal present at the control input, and that the motor controller is designed to change to a configuration mode when a communication signal has been detected at the control input, and to process the received communication signal.

With regard to an interface adapter, the above objective is achieved through the features of Claim 13. Accordingly, the interface adapter comprises a first interface and a second interface, wherein the first interface can be connected to an end device, in particular a programming device, and wherein the interface adapter converts data received via the first interface to an input signal for the input stage, and outputs this signal to the input stage.

In a manner according to the invention, it has first been acknowledged that the provision of a separate communication interface by means of separate communication lines can be eliminated in a comparably simple manner. It has been determined, specifically, that the control signal, with which a target value is specified for the motor controller, is only necessary in a normal operation of the motor controller. This control signal is not needed during the parameterization of the motor controller. As a result, the interface provided in the motor controller is used for specifying the control signal according to the invention, and an input stage designed specifically for the motor controller is provided.

With the input stage according to the invention, the fact that an input signal between a first voltage $U_{unten}$ and a second voltage $U_{oben}$ is normally used to specify a target value is exploited, wherein the second voltage $U_{oben}$ is greater than the first voltage $U_{unten}$. Voltages between $U_{unten}=0$ V and $U_{oben}=10$ V are normally used. This means that normally, in a normal operating mode, the input signal does not, or does not significantly, exceed the second voltage. This fact can be used such that the transmission of a communication signal is indicated with a voltage that is higher than a first threshold voltage $U_{S1}$, wherein the first threshold voltage $U_{S1}$ is greater than the second voltage $U_{oben}$. It is only important thereby that the input stage and/or the motor controller can appropriately process the higher input voltage, and the higher input voltage does not lead to damage to the electronics or components thereof.

In order to evaluate an input signal of this type, the input stage according to the invention comprises a first comparator, which compares the input signal with a first threshold value $U_{S1}$. When the input signal reaches or exceeds the first threshold voltage $U_{S1}$, the comparator issues an activation signal. This activation signal is supplied to a data output unit, which then causes the output of a communication signal, wherein the communication signal is generated, based on at least a portion of the input signal. In this manner, by supplementing functions of the control input, a communication with the motor controller can be provided, without dedicated communication lines or connection clips having to be installed. As a result, the installation effort is significantly reduced.

Because a communication with the motor controller, in particular for inputting parameterizations, programming, or other types of adjustments, must only be carried out rarely, mobile interface adapters can be provided for this, which cause the input stage to generate an activation signal, and to generate an appropriately modulated input signal in the input stage, from which the data output unit can generate a communication signal for the motor controller. In this manner, relatively few additional components are needed in order to provide the motor controller with a communication capability.

Even when the design of the interface adapter as a mobile device is a preferred design, "stationary" interface adapters are also conceivable, i.e. where the interface adapter remains on the device. This can be used, in particular, in application scenarios in which modifications to the parameterization of the firmware are to be carried out frequently. The advantages of the input stage according to the invention can also be implemented in these scenarios, e.g. regarding the reduction of the installation effort. It is also conceivable for the interface adapter to be integrated or disposed in the controlling device, which outputs a target value to the motor controller. The interface adapter can be connected to a bus, e.g. a digital bus system, which enables the transmission of a new parameterization or program update from a greater distance. When the interface adapter is integrated in the controlling device, the bus system can be used for controlling the motor as well as for parameterization.

The input stage according to the invention can be realized in a wide variety of ways. It is conceivable to dispose the components of the input stage in a separate module, which is interconnected between the actual motor controller and the control input. In a preferred design, the input stage is disposed, however, on the printed circuit board of the motor controller. Because few components are needed to implement the input stage, these can be comparably easily disposed on the motor controller printed circuit board.

In theory, the data output unit can generate the communication signal on the basis of a wide variety of components of the input signal. Thus, for example, after activation of the data output unit, a frequency and/or amplitude modulated signal can be input, which can assume a wide variety of voltage levels. In a preferred design, however, the data output unit generates the communication signal from a portion of the input signal that is greater than or equal to the first threshold voltage $U_{S1}$. In this manner, the activation of a configuration mode by a voltage spike that exceeds the first threshold voltage $U_{S1}$ and sets the motor controller in an undefined state, can be prevented. When a portion of the input voltage that is greater than or equal to the first threshold voltage $U_{S1}$ is used to generate the communication signal, the input signal remains in a configuration mode above the first threshold voltage $U_{S1}$, by means of which an activation signal is outputted continuously through the first comparator. As a result, the operational reliability can be increased, in particular in rough operating environments having a high portion of disruptive signals.

In a preferred design, a first switch device is provided for activating the output of the communication signal by the data output unit to the output of the input stage. The first switch device preferably has two inputs thereby, wherein one of the two inputs is connected to the data output unit and wherein the control signal is applied, at least temporarily, to the second of the two inputs. In this manner, the first switch device can activate either the control signal or the communication signal at the output of the switch device. With the use of a first switch device, the activation signal is designed as a switching signal for the switch device, which is input into a switch input of the switch device, and triggers a switching procedure when it has exceeded or fallen below a switching level. The first switch device can be designed thereby, such that with a voltage at the switch input that is lower than the switching level, the control signal is output to the output of the switch device. When the switch level is exceeded by the activation signal, the switch device can switch to the other input, and thus output the communication signal to the output.

The data output unit can be designed in principle in a wide variety of ways. The respective design of the data output unit depends substantially on which portions of the input signal the communication signal is to be extracted from. In a preferred design, the data output unit comprises a second switch device and a second comparator. The second comparator compares the input signal with a second threshold voltage $U_{S2}$, wherein the second threshold voltage $U_{S2}$ is greater than the first threshold voltage $U_{S1}$. When the threshold voltage $U_{S2}$ has been reached or exceeded by the input signal, the second comparator can generate a switching signal, and output it to a switch input of the second switch device. The second switch device can have two inputs thereby, one of which has a first logic signal, and the other has a second logic signal. The first logic signal and the second logic signal represent complementary logic values, in particular a logical 0 and a logical 1. The logic signals can be formed in different ways thereby. Thus, the first logic signal can depict a square wave signal having a first frequency, and the second logic signal can depict a square wave voltage having a second frequency. In this manner, a frequency modulated signal can be generated at the output of the switch device by switching from the first logic signal to the second logic signal, or vice versa. In a preferred design, however, the first logic signal is formed by a high level, and the second logic signal is formed by a low level. A low level of 0 volts and a high level of +5 volts are conceivable, for example.

In operation, the second switch device if preferably designed such that when the switching signal falls below a switching level, the first logic signal is applied to an output of the second switch device, while when the switching signal exceeds the switching level, the second logic signal is applied to the output of the second switch device. Because the switching signal is output by the second comparator, which compares the input signal with the second threshold voltage $U_{S2}$, this means that when the input signal falls below the second threshold voltage $U_{S2}$, the first logic signal is applied to the output of the second switch device, while when it reaches or falls below the second threshold voltage $U_{S2}$, the switch device is actuated, and as a result, the second logic signal is applied to the output of the second switch device. It should be noted here, that with the "falling below a switching level" and with "exceeding a switching level," it is not necessary that the switching levels be identical. Instead, the switch device can exhibit a certain hysteresis, such that the switching levels for switching the switch device can deviate from one another.

The first and/or second comparator and the first and/or second switch device can be implemented in a wide variety of ways. The comparator(s) can each be implemented with an operational amplifier, to which the respective threshold voltage is applied at its one input, e.g. the inverting input, and to which the input signal is applied at its second input, e.g. at the non-inverting input. In order to obtain defined switching levels for a switch device, the operational amplifier can be connected as a Schmitt trigger. The switch device(s) are preferably implemented by an electronic switch device. The use of one or more MOSFETs (metal-oxide-semiconductor field-effect transistors) is conceivable, for example. With a sufficient level modification of the input signal, the threshold voltage(s) need not all be too precise. Precision voltage sources are not necessary. In a very simple design, the threshold voltage(s) can be generated by a voltage divider or by Zener diodes.

In the normal operation of the input stage and the motor controller, i.e. the input signal has a voltage between the first voltage $U_{unten}$ and the second voltage $U_{oben}$, the generation of a control signal from the input signal can take place in a wide variety of ways. In the simplest design, the input signal can be conveyed to the motor controller as a control signal, wherein in this case a voltage surge protection, e.g. in the form of a Zener diode, can also be provided, due to the possibility of a higher voltage than the second voltage $U_{oben}$. In a preferred design, however, an analog-to-PWM converter is provided for generating the control signal from the input signal. The analog-to-PWM converter generates a PWM signal (pulse width modulated signal) from the input signal. The generated PWM signal preferably has a fixed frequency, e.g. 1 kHz. Different voltages of the input signal can be encoded into the phase control factor of the PWM signal. The first voltage $U_{unten}$ is encoded into a first phase control factor, the second voltage $U_{oben}$ is encoded into a second phase control factor, and voltages between the first voltage $U_{unten}$ and $U_{oben}$ are encoded by a phase control factor between the first and second phase control factors. The voltage range is preferably formed thereby in a linear manner on the phase control factor. When, for example, the first voltage $U_{unten}$=0 V, and the second voltage $U_{oben}$=10 V, the first voltage can be encoded, for example, into a first phase control factor of 25%, and the second voltage $U_{oben}$ can be encoded into a second phase control factor of 75%. With a linear assignment of the voltages between the first and second voltages to the phase control factor, a voltage of 4 volts would result in a phase control factor of 45%, by way of example, i.e. during a period of the PWM signal, a high level would be applied to 45%, and a low level would be applied to 55%. Suitably appropriate analog-to-PWM converters are sufficiently known from the practice.

A motor controller according to the invention has an input stage according to the invention. The motor controller is substantially the same as the motor controllers known from the practice in terms of its fundamental functions. Thus, the motor controller has a control input, via which the motor controller can receive a control signal. The motor controller controls a motor connected to it in accordance with the target value encoded in this control signal, such that the target value is at least approximately maintained. In many designs, the target value is a target rotational rate, i.e. the motor controller controls or regulates the motor such that the target rotational rate is at least approximately maintained. The motor controller according to the invention also has means, according to the invention, for detecting a communication signal sent to the control input. When a communication signal has been detected at the control input, the motor controller switches into a configuration mode, and then processes the received communication signal. The design of the communication signal depends on what is transmitted with the communication signal. When a modified parameter is transmitted to the motor controller, the motor controller adjusts the parameterization. If a firm-ware is transmitted, or other types of programming modifications, the motor controller updates the program stored in the motor controller accordingly when it processes the communication signal.

The means for detecting a communication signal can be designed in a wide variety of ways. It is thus conceivable that a logic level is transmitted to the motor controller from the input stage via a separate dedicated line, with which the activation signal, for example, is transmitted from the first comparator directly to the motor controller. As a result, the switching to a configuration mode is signaled in a particularly simple manner. Regarding a sufficient sturdiness, in particular in industrial environments, the means for detecting a communication signal are preferably designed, however, to evaluate the frequency of a signal applied to the control input of the motor controller. In this manner, when a first frequency has been detected, it indicates a control signal, and when a second frequency has been detected, this indicates a communication signal. When the control signal has a frequency of 1 kHz, in accordance with the above example, then the first frequency, which must detect the means for detecting a communication signal, would be a frequency of 1 kHz. The second frequency is defined by the frequency with which the data output unit encodes the communication signal. A frequency greater than 9 kHz is conceivable, for example. In this manner, a communication signal can be detected simply, through appropriate frequency sensitivity.

Because a response by the motor controller is useful in the parameterization or programming of the motor controller, the motor controller can have a specially designed message output, which the motor controller can use as a communication line. It is conceivable to use the message output for signaling operating states in the normal operation of the motor controller, and for sending responses to a received communication signal in the configuration mode. In this manner, with this further development of the motor controller according to the invention, an Rx line can be implemented via the control input, and a Tx line can be implemented via the message output. This enables a bidirectional communication between a programming device and the motor controller.

Regarding the ending of the configuration mode, various designs are likewise conceivable. Thus, after ending a configuration procedure, a reset button can be actively actuated, for example, by means of which the motor controller is restarted, and returns to a normal operating mode after the restart. It would also be conceivable, however, that a termination signal is sent to the motor controller with the communication signal, by means of which the motor controller ends the configuration mode when the termination signal has been detected, and returns to the normal operating mode. This can also take place in conjunction with a restart of the motor controller, i.e. the termination signal initiates a restart of the motor controller.

There are thus various possibilities for developing and refining the teachings of the present invention in an advantageous manner. For this, reference is made on one hand to the Claims subordinate to Claims 1 and 9, and on the other hand to the following explanation of a preferred exemplary embodiment of the invention based on the drawings. Generally preferred developments and refinements of the teachings shall also be explained in conjunction with the explanation of the preferred exemplary embodiment of the invention based on the drawings. Shown in the drawings, the single FIGURE shows a schematic illustration of an exemplary embodiment of an input stage for a motor controller, according to the invention.

The single FIGURE shows an exemplary embodiment of an input stage 1 according to the invention, which is connected to a motor controller 2. The input stage 1 has an input 3 and an output 4. A first comparator 5, a second comparator 6, a first switch device 7 and a second switch device 8, as well as an analog-to-PWM converter 9 are contained in the input stage. The input 3 is connected to the non-inverting input of the first comparator 5, the non-inverting input of the second comparator 6, and the analog input of the analog-to-PWM converter 9. A first threshold voltage $U_{S1}$=13 V is applied to the inverting input of the first comparator 5. A second threshold voltage $U_{S2}$=15 V is applied to the inverting input of the second comparator 6. In this manner, the first comparator 5 compares an input signal present at the input 3 with a first threshold voltage $U_{S1}$ of 13 volts, while the second comparator 6 compares the input signal with the second threshold voltage $U_{S2}$ of 15 volts. The output of the first comparator 5 is connected to the switch input of the first switch device 7, and the output of the second comparator 6 is connected to the switch input of the second switch device 8. The PWM output of the analog-to-PWM converter 9 is connected to one of the inputs of the first switch device, which is applied, without a switching signal being present, to the output of the first switch device. The second input of the first switch device 7 is connected to the output of the second switch device 8. A first logic signal and a second logic signal are present at the inputs of the second switch device, which are symbolically indicated with a "1" for a logical 1 and a "0" for a logical 0. With a control voltage lying below a switching level at the switch input of the second switch device 8, the first logic signal is activated at the output in the standard manner, corresponding to a logical 1. The second comparator 6 and the second switch device 8 collectively form the data output unit 10.

When there is a voltage of less than 13 volts at the input 3 of the input stage 1, there is a voltage at the output of the first comparator and at the output of the second comparator that is less than the switching threshold for the first switch device 7 and the second switch device 8. The first switch device 7 is thus in the home position, in which the signal of the analog-to-PWM converter 9 is applied to the output of the switch device 7 and thus to the output of the input stage 1. The analog-to-PWM converter 9 has a working range between a first voltage $U_{unten}$=0 V and a second voltage $U_{oben}$=10 V. The PWM signal outputted by the analog-to-PWM converter 9 has a fixed frequency of 1 kHz, wherein the phase control factor is selected depending on the voltage applied to the analog input. In the present exemplary embodiment, the phase control factor is 25% with a voltage of 0 V, which increases in a linear manner as the input voltage increases, until a voltage of 10 V and a phase control factor of 75% is obtained.

When a communication signal is to be sent to the motor controller 2, the input signal must have a voltage that is suitable for activating the first switch device 7. Because the first threshold voltage $U_{S1}$ selected in the exemplary embodiment is 13 V, the input voltage applied to the input 3 must reach or exceed a voltage of 13 V. When the voltage of 13 V has been reached or exceeded, the first comparator 4 outputs an activation signal to the control input of the first switch device 7, which causes the first switch device 7 to switch to the other input of the first switch device 7. As a result, a signal generated by the data output unit 10 is present at the output 4 of the input stage 1, and the outputting of a communication signal by the data output device is activated at the output of the input stage. In the selected design, a logical 1 is outputted to the motor controller 2. If the input signal reaches or exceeds a voltage of 15 V, the second comparator 6 outputs a switching signal to the second switch device 8, by means of which the second switch device 8 is switched to the other input, corresponding to a logical 0. Thus, with a voltage greater than 13 V and less than 15 V, a logical 1 can be encoded in the input signal, and with a voltage greater than 15 V, a logical 0 can be encoded in the input signal. It would be conceivable, for example, to encode a logical 0 in the input signal with a voltage of 14 V, and a logical 0 in the input signal with a voltage of 16 V. In this manner, the input stage 1 according to the invention can output the currently typical control voltage between 0 and 10 volts to the motor controller 2 as a control signal, and at the same time, transmit a communication signal to the motor controller when the voltage is greater than 10 volts.

The output 4 in the input stage 1 is connected to a control input 11 of the motor controller 2. Means for detecting the frequency of the signals present at the input 11 are implemented in the motor controller when it is in operation. These means indicate the application of a control signal with a signal frequency of 1 kHz, for example. The target value encoded in the control signal, e.g. a target rotational rate, is processed appropriately by the motor controller, and regulates the motor connected to the motor controller to the target rotational rate. If the communication pathway is activated due to the voltage level in the input signal, this frequency is then no longer present at the input 11 of the motor controller 2. This can be used for detecting a configuration mode. Alternatively, the frequency of the communication interface can be established such that it is significantly higher than the frequency of the PWM signal, e.g. greater than or equal to 9 kHz. The motor controller 2 determines, on the basis thereof, whether there is an analog control signal or a communication signal at the input of the input stage.

When a communication signal has been detected at the input 11 of the motor controller 2, the evaluation of the analog control signal is terminated, and the input 11 is reconfigured to a data input RxD. The motor controller is then switched to a configuration mode. As long as the motor connected to the motor controller is still in motion, the motor can be brought into a safe operating mode, e.g. it can be brought to a standstill. Alternatively, the motor could continue to rotate at the previously inputted target rotational rate, until the motor controller returns to a normal operating mode, and the control input is again evaluated. The motor controller 2 also has a message output 12, via which status messages regarding the motor and/or the motor controller connected thereto can be outputted when in the normal operating mode. When the configuration mode is activated, the message output 12 is reconfigured to a transmission line TxD.

In order to input a control signal, and for communication, an appropriate input device (not shown) is connected to a control input 13 and a message output 14. When the motor controller controls an EC motor with a ventilator, for example, a regulator can be connected to the control input, which receives status information regarding the motor via the message output 14. In the normal operating mode, the regulator generates an input signal between 0 V and 10 V, and inputs this to the control input 13 in the present exemplary embodiment. The control input 13 is connected to the input 3 of the input stage 1.

In order to configure the motor controller, an appropriate communication signal must be inputted. For this, a communication device can be connected, instead of the regulator. This communication device can either generate an appropriate modulated communication signal directly, or it can be connected to an interface adapter. The interface adapter can have a standard interface at the input side, e.g. an RS-485 interface. At the output side, the interface adapter is connected to the control input 13 and the message input 14. When a logical 1 is received via the RS-485 interface, the interface adapter converts this to a voltage of 14 V for example. With a logical 0 at the RS-485 interface, the interface adapter outputs a voltage of 16 V, for example. The interface adapter thus functions as an amplitude modulator. Accordingly, the interface adapter can convert a signal received via the message output into an RS-485 signal. In this manner, a conventional communication device having an RS-485 interface can be connected to the motor controller according to the invention using an interface adapter.

In the exemplary embodiment illustrated in the FIGURE, the state of the configuration mode remains intact until the motor controller 2 has been reset. An analog control signal can first be evaluated again in the motor controller 2 after the reset.

The installation costs can be kept to a minimum with the design of the input stage according to the invention and the motor controller according to the invention described herein. As a result of the interface adapter, there is a minimal number of components required in the input stage, which in turn has a positive effect on the overall costs. As a result, the input stage can be used in small and inexpensive ventilators. Anything necessary for implementing an interface in an industry standard can be disposed outside the ventilator in the interface adapter. This interface adapter is mobile, and can be removed after it has been used. For applications in which modifications are frequently carried out, for example, the interface adapter can also be stationary, i.e. it can remain with the device.

With regard to further advantageous designs of the input stage according to the invention, or the motor controller according to the invention, reference is made to the general part of the description, as well as to the attached claims, in order to avoid repetition.

Lastly, it should be expressly noted that the description of exemplary embodiment above serves only for a discussion of the claimed teachings, but these are not limited to the exemplary embodiment.

LIST OF REFERENCE SYMBOLS 1 input stage
2 motor controller
3 input
4 output
5 first comparator
6 second comparator
7 first switch device
8 second switch device
9 analog-to-PWM converter
10 data output unit
11 control input/RxD
12 message output/TxD
13 control input
14 message output

The invention claimed is:

1. An input stage for a motor controller, in particular a motor controller for an electric motor, wherein the input stage has an input for inputting an input signal, and an output for connecting to the motor controller, wherein the input stage is designed to generate a control signal from an input signal between a first voltage $U_{unten}$ and a second voltage $U_{oben} > U_{unten}$, and to output the control signal as a target value parameter to the motor controller via the output, characterized by a first comparator for comparing the input signal with a first threshold voltage $U_{S1} > U_{oben}$, and a data output unit, wherein the data output unit generates a communication signal on the basis of at least a portion of the input signal, wherein the first comparator outputs an activation signal when the first threshold voltage $U_{S1}$ has been reached or exceeded by the input signal, which activates an outputting of the communication signal to the output by the data output unit.

2. The input stage according to claim 1, characterized in that the data output unit generates the communication signal from the portion of the input signal that is greater than or equal to the first threshold voltage $U_{S1}$.

3. The input stage according to claim 1, characterized in that a first switch device is provided for activating the output of the communication signal to the output by the data output unit, wherein the first switch device has two inputs, wherein one of the two inputs of the first switch device is connected to the data output device, and wherein the control signal is at least temporarily applied to the second of the two inputs.

4. The input stage according to claim 3, characterized in that the first switch device is designed such that when the activation signal falls below a switching level, the control signal is present at an output of the first switch device, and when the activation signal exceeds the switching level, the communication signal is present at the output of the first switching device.

5. The input stage according to claim 1, characterized in that the data output unit comprises a second switching device and a second comparator for comparing the input signal with a second threshold voltage $U_{S2} > U_{S1}$, wherein the second comparator outputs a switching signal to the second switch device when the second threshold voltage $U_{S2}$ has been reached or exceeded.

6. The input stage according to claim 5, characterized in that the second switch device has two inputs, wherein a first logic signal is input to one of the two inputs, and a second logic signal is input to the other of the two inputs, wherein the first logic signal and the second logic signal represent complementary logic values.

7. The input stage according to claim 6, wherein the first logic signal has a high level and the second logic signal has a low level.

8. The input stage according to claim 5, characterized in that the second switch device is designed such that when the switching signal exceeds a switching level, the first logic signal is input to the output of the second switch device, and in that when the switching signal exceeds the switching level, the second logic signal is input to the output of the second switch device.

9. The input stage according to claim 1, characterized in that the input stage has an analog-to-pulse width modulated (PWM) converter for generating the control signal from the input signal, which generates a PWM signal from the input signal.

10. The input stage according to claim 9, wherein the PWM signal has a fixed frequency.

11. The input stage according to claim 9, wherein the voltage value of the input signal is encoded in a phase control factor of the PWM signal.

12. A motor controller, in particular for an electric motor, having an input stage according to claim 1, wherein the input stage is connected to a control input of the motor controller, wherein the motor controller controls a motor connected to the motor controller on the basis of a control signal received via the control input, such that a target value encoded in the control signal is at least approximately maintained, characterized in that the motor controller has means for detecting a communication signal input to the control input, and in that the motor controller is designed to switch to a configuration mode when a communication signal has been detected at the control input, and to process the received communication signal.

13. The motor controller according to claim 12, characterized in that the means for detecting a communication signal are configured to evaluate the frequency of a signal at the control input, wherein a control signal is indicated when a first frequency has been detected, and a communication signal is indicated when a second frequency has been detected.

14. The motor controller according to claim 12, characterized by a message output for outputting status information, wherein the motor controller is configured to use the message output as a communication line when in the configuration mode, for sending responses to a received communication signal.

15. The motor controller according to one of the claim 12, characterized in that the motor controller is configured to detect a termination signal in the communication signal, wherein the motor controller is configured to end the configuration mode when a termination signal has been detected.

16. An interface adapter for connection to an input stage according to claim 1, having a first interface and a second interface, wherein the first interface can be connected to an end device, in particular a programming device, wherein the second interface can be connected to the input stage, and wherein the interface adapter converts data received via the first interface to an input signal for the input stage, and outputs this data to the input stage.

* * * * *